(12) United States Patent
O'Neal et al.

(10) Patent No.: US 11,526,203 B2
(45) Date of Patent: Dec. 13, 2022

(54) METHOD FOR SWITCHING POWER MODE OF COMPUTER DEVICE BASED ON DETECTED AND DETERMINED SYSTEM STATE, COMPUTER ACCESSORY, AND COMPUTER SYSTEM APPLYING THE METHOD

(71) Applicant: LUXSHARE-ICT CO., LTD., Taipei (TW)

(72) Inventors: Sean P. O'Neal, Taipei (TW); Erh-Tai Tsai, Taipei (TW); Quan-Fei Ning, Taipei (TW); Chih-Hsiung Chang, Taipei (TW); Ya-Ling Huang, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 0 days.

(21) Appl. No.: 17/331,797

(22) Filed: May 27, 2021

(65) Prior Publication Data
US 2022/0236784 A1 Jul. 28, 2022

Related U.S. Application Data

(63) Continuation-in-part of application No. 17/159,666, filed on Jan. 27, 2021.

(51) Int. Cl.
*G06F 1/32* (2019.01)
*G06F 1/3234* (2019.01)
*G06F 1/26* (2006.01)

(52) U.S. Cl.
CPC ............ *G06F 1/3234* (2013.01); *G06F 1/266* (2013.01)

(58) Field of Classification Search
CPC .............................. G06F 1/3234; G06F 1/266
See application file for complete search history.

(56) References Cited

U.S. PATENT DOCUMENTS 5,832,237 A * 11/1998 Lee ..................... G06F 13/4081
713/300
8,756,445 B2 6/2014 Walsh et al.
(Continued)

FOREIGN PATENT DOCUMENTS

CN 103713913 B 2/2018
WO WO-2021242254 A1 * 12/2021

*Primary Examiner* — Chun Cao
(74) *Attorney, Agent, or Firm* — Birch, Stewart, Kolasch & Birch, LLP

(57) ABSTRACT

A method for switching a power mode of a computer device is adapted to a computer accessory. The method comprises setting a power management mode of the computer device to be awakened when connected to the external power; connecting the computer accessory to a host connector of the computer device to establish a power connection and a communication connection through a host signal pin set of the host connector; through the power connection and the communication connection, detecting and determining the power mode of the computer device; and executing one of following steps upon receiving the switch signal: when the power mode is the normal operation state, transmitting a communication signal; when the power mode is the Suspend-To-RAM state, transmitting a wake up signal; and when the power mode is the Suspend-To-Disk state or the shutdown state, temporarily cutting off the external power and then restoring the external power.

20 Claims, 5 Drawing Sheets

(56) References Cited

U.S. PATENT DOCUMENTS

| | | | | |
|---|---|---|---|---|
| 9,558,527 | B2* | 1/2017 | Sierra | G06F 3/1438 |
| 2007/0124613 | A1* | 5/2007 | Morisawa | G06F 1/263 |
| | | | | 713/300 |
| 2010/0019583 | A1* | 1/2010 | DuBose | G06F 1/3203 |
| | | | | 307/126 |
| 2011/0231682 | A1* | 9/2011 | Kakish | G06F 1/3215 |
| | | | | 710/72 |
| 2012/0139348 | A1* | 6/2012 | DuBose | G06F 1/263 |
| | | | | 307/80 |
| 2015/0052343 | A1* | 2/2015 | Yi | G06F 9/4418 |
| | | | | 713/2 |
| 2015/0082061 | A1* | 3/2015 | Ramirez | G06F 1/1632 |
| | | | | 713/323 |
| 2021/0149471 | A1* | 5/2021 | O'Neal | G06F 1/3228 |
| 2022/0066531 | A1* | 3/2022 | Huang | G06F 1/1632 |

* cited by examiner

METHOD FOR SWITCHING POWER MODE OF COMPUTER DEVICE BASED ON DETECTED AND DETERMINED SYSTEM STATE, COMPUTER ACCESSORY, AND COMPUTER SYSTEM APPLYING THE METHOD

CROSS REFERENCE TO RELATED APPLICATION

The present application is a continuation-in-part of U.S. patent application Ser. No. 17/159,666 filed Jan. 27, 2021, entitled "METHOD FOR WAKING UP NOTEBOOK COMPUTER, COMPUTER ACCESSORY, AND COMPUTER SYSTEM".

The above-listed application is hereby incorporated by reference herein in its entirety.

TECHNICAL FIELD

This disclosure relates to power modes of a computer host, and more particularly to a method for switching power mode of computer device, a computer accessory and a computer system.

RELATED ART

In Advanced Configuration and Power Interface (ACPI) of a personal computer power mode of the computer is able to be switched to sleep state so as to reduce power consumption. In sleep state, when a button or a switch of the computer is operated, the sleeping computer is triggered to perform a wake-up operation.

Regarding to a computer device, the user can use the BIOS to set the device to automatically trigger the wake-up operation to switch the power mode to normal state after connecting the external power.

The aforementioned external power can be delivered by an AC-DC power adapter or a docking station. Generally speaking, when using AC-DC power adapter or docking station, the user may decide to use the notebook computer of which the lid is closed by using the external display, keyboard and mouse connected to the notebook computer. When the lid of the notebook computer is closed, if the notebook computer needs to be awakened from the sleep state, the user has to manually disconnect the external power and then reconnect, or the user has to open the lid of the notebook computer and operate button/switches of the notebook computer, to trigger the wake-up operation. Triggering wake-up operation in the aforementioned state is inconvenient, and the method of triggering wake-up operation needs to be changed.

SUMMARY

In view of the foregoing problem, this disclosure discloses a method for switching power mode of computer device, a computer accessory and a computer system, for quickly and easily switching the power mode of the computer device.

At least one embodiment of this disclosure discloses a method for switching a power mode of a computer device is adapted to a computer accessory. The computer device includes a host connector. The host connector at least includes a power receiving pin set and a host signal pin set, the power receiving pin set is configured to receive an external power, and the host signal pin set is configured to receive a communication signal. The method comprises: setting a power management mode of the computer device to be awakened when connected to the external power, to switch a power mode of the computer device to a normal operation state; connecting the computer accessory to the host connector of the computer device to establish a power connection through the power receiving pin set and deliver an external power to the computer device, and to establish a communication connection through the host signal pin set; through the power connection and the communication connection, detecting and determining the power mode of the computer device to be the normal operation state, a Suspend-To-RAM state, a Suspend-To-Disk state, or a shutdown state; and determining whether the computer accessory receives a switch signal, and executing one of following steps upon receiving the switch signal: when the power mode is the normal operation state, transmitting the sleep command to the host signal pin set; when the power mode is the Suspend-To-RAM state, transmitting a wake up signal to the host signal pin set; and when the power mode is the Suspend-To-Disk state or the shutdown state, using the computer accessory to temporarily cut off the external power and then restore the external power.

In one or more embodiments of this disclosure, the method further comprises through the communication connection detecting an operation system version executed by the computer device, to generate the communication signal corresponding to the operation system version.

In one or more embodiments of this disclosure, the sleep command is a script segment of a USB HID report descriptor, the USB HID report descriptor depends on the operation system version, and the wake up signal is a data package.

In one or more embodiments of this disclosure, the method further comprises disposing a switch member on the computer accessory, wherein the switch member is configured to generate the switch signal.

In one or more embodiments of this disclosure, the method further comprises when the power mode is the normal operation state, determining whether an input device of the computer device is operated; and if the input device has not been operated for a preset time period, the computer device returns to the Suspend-To-RAM state.

At least one embodiment of this disclosure discloses a computer accessory for connecting to a computer device. The computer device includes a host connector; the host connector at least includes a power receiving pin set and a host signal pin set. The power receiving pin set is configured to receive an external power, and the host signal pin set is configured to receive a communication signal; and a power management mode of the computer device is set to be awakened to perform a wake-up operation when connected to the external power, to switch a power mode of the computer device to a normal operation state.

The computer accessory comprises an expansion connector, a power delivery controller, a control circuit, and a switch member. The expansion connector is configured to connect to the host connector. The expansion connector at least includes a power delivery pin set and an expansion signal pin set. The power delivery pin set is configured to connect the power receiving pin set to establish a power connection to transmit the external power to the computer device. The expansion signal pin set is configured to connect the host signal pin set to establish a communication connection. The power delivery controller is connected to the power delivery pin set to output the external power through the power delivery pin set. The control circuit is connected to the expansion signal pin set and the power delivery controller. The switch member is connected to the control circuit and is configured to generate a switch signal to the control circuit.

Through the power connection and the communication connection, the control circuit detects and determines the power mode of the computer device to be the normal operation state, a Suspend-To-RAM state, a Suspend-To-Disk state, or a shutdown state, and determines whether receiving the switching signal. The control circuit is arranged to execute one of following steps upon receiving the switch signal:

when the power mode is the normal operation state, transmitting the sleep command to the host signal pin set;

when the power mode is the Suspend-To-RAM state, transmitting a wake up signal to the host signal pin set; and when the power mode is the Suspend-To-Disk state or the shutdown state, controlling the power delivery controller to temporarily cutting off the external power and then restore the external power.

In one or more embodiments of this disclosure, the power delivery controller is configured to connect an electric power source to generate the external power.

In one or more embodiments of this disclosure, through the communication connection the control circuit detects an operation system version executed by the computer device, to generate the communication signal corresponding to the operation system version.

In one or more embodiments of this disclosure, the expansion connector is a USB connector.

In one or more embodiments of this disclosure, the control circuit includes a controller and a USB hub, the controller connects the expansion signal pin set through the USB hub and the controller is configured to detect the operation system version to generate the communication signal corresponding to the operation system version.

In one or more embodiments of this disclosure, the sleep command is a script segment of a USB HID report descriptor, the USB HID report descriptor depends on the operation system version, and the wake up signal is a data package.

In one or more embodiments of this disclosure, the power delivery pin set includes a channel configuration pin, and through the channel configuration pin the control circuit detects whether the expansion connector connects the host connector.

At least one embodiment of this disclosure discloses a computer system comprising a computer device and a computer accessory. The computer device at least includes a host connector. The host connector at least includes a power receiving pin set and a host signal pin set. The power receiving pin set is configured to receive an external power, and the host signal pin set is configured to receive a communication signal. A power management mode of the computer device is set to be awakened to perform a wake-up operation when connected to the external power, to switch a power mode of the computer device to a normal operation state; the computer accessory comprises an expansion connector, a power delivery controller, a control circuit, and a switch member. The expansion connector is configured to connect to the host connector. The expansion connector at least includes a power delivery pin set and an expansion signal pin set. The power delivery pin set is configured to connect the power receiving pin set to establish a power connection to transmit the external power to the computer device. The expansion signal pin set is configured to connect the host signal pin set to establish a communication connection. The power delivery controller is connected to the power delivery pin set to output the external power through the power delivery pin set. The control circuit is connected to the expansion signal pin set and the power delivery controller. The switch member is connected to the control circuit and is configured to generate a switch signal to the control circuit.

Through the power connection and the communication connection, the control circuit detects and determines the power mode of the computer device to be the normal operation state, a Suspend-To-RAM state, a Suspend-To-Disk state, or a shutdown state, and determines whether receiving the switch signal. The control circuit is arranged to execute one of following steps upon receiving the switch signal:

when the power mode is the normal operation state, transmitting the sleep command to the host signal pin set, to switch the power mode to the Suspend-To-RAM state;

when the power mode is the Suspend-To-RAM state, transmitting a wake up signal to the host signal pin set, to switch to the power mode to the normal operation; and when the power mode is the Suspend-To-Disk state or the shutdown state, controlling the power delivery controller to temporarily cutting off the external power and then restore the external power, to switch to the power mode to the normal operation.

In one or more embodiments of this disclosure, the power delivery controller is configured to connect an electric power source to generate the external power.

In one or more embodiments of this disclosure, through the communication connection the control circuit detects an operation system version executed by the computer device, to generate the sleep command corresponding to the operation system version.

In one or more embodiments of this disclosure, the expansion connector is a USB connector.

In one or more embodiments of this disclosure, the control circuit includes a controller and a USB hub, the controller connects the expansion signal pin set through the USB hub and the controller is configured to detect the operation system version to generate the communication signal corresponding to the operation system version.

In one or more embodiments of this disclosure, the sleep command is a script segment of a USB HID report descriptor, the USB HID report descriptor depends on the operation system version, and the wake up signal is a data package.

In one or more embodiments of this disclosure, the power delivery pin set includes a channel configuration pin, and through the channel configuration pin the control circuit detects whether the expansion connector connects the host connector. When the power mode is the normal operation state, the computer device determines whether an input device of the computer device is operated; and if the input device has not been operated for a preset time period, the computer device returns to the Suspend-To-RAM state.

In one embodiment or some embodiments of this disclosure, switching the power mode only requires simple operation of the switch member to generate the switch signal, directly operating buttons/switches of the computer device is not required and manually disconnecting and reconnecting the connection between the expansion connector and host connector is not required. For example, in a case that the computer accessory is already connected to a notebook as the computer device with the lid closed, the input device connected, and an external display connected, the power mode of the computer device switched simply by triggering the switch member without the needs of opening the lid or reconnecting the computer accessory. Therefore, the approach to switch the power mode becomes more convenient. In addition, the approaches in one or more embodiments of this disclosure can be easily combined with a general AC-DC power adapter or docking station, and applicable to products from various venders.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
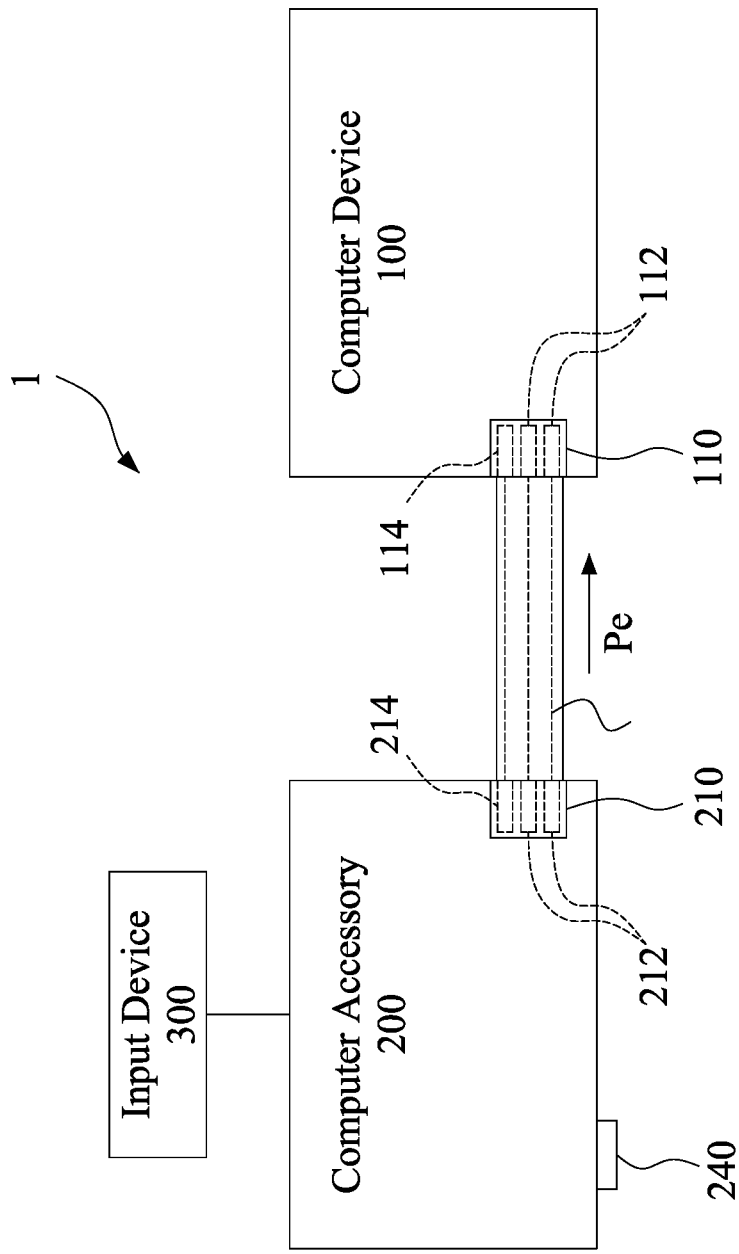
FIG. 1 illustrates a block diagram of the computer system according to an embodiment of this disclosure.
Figure 2:
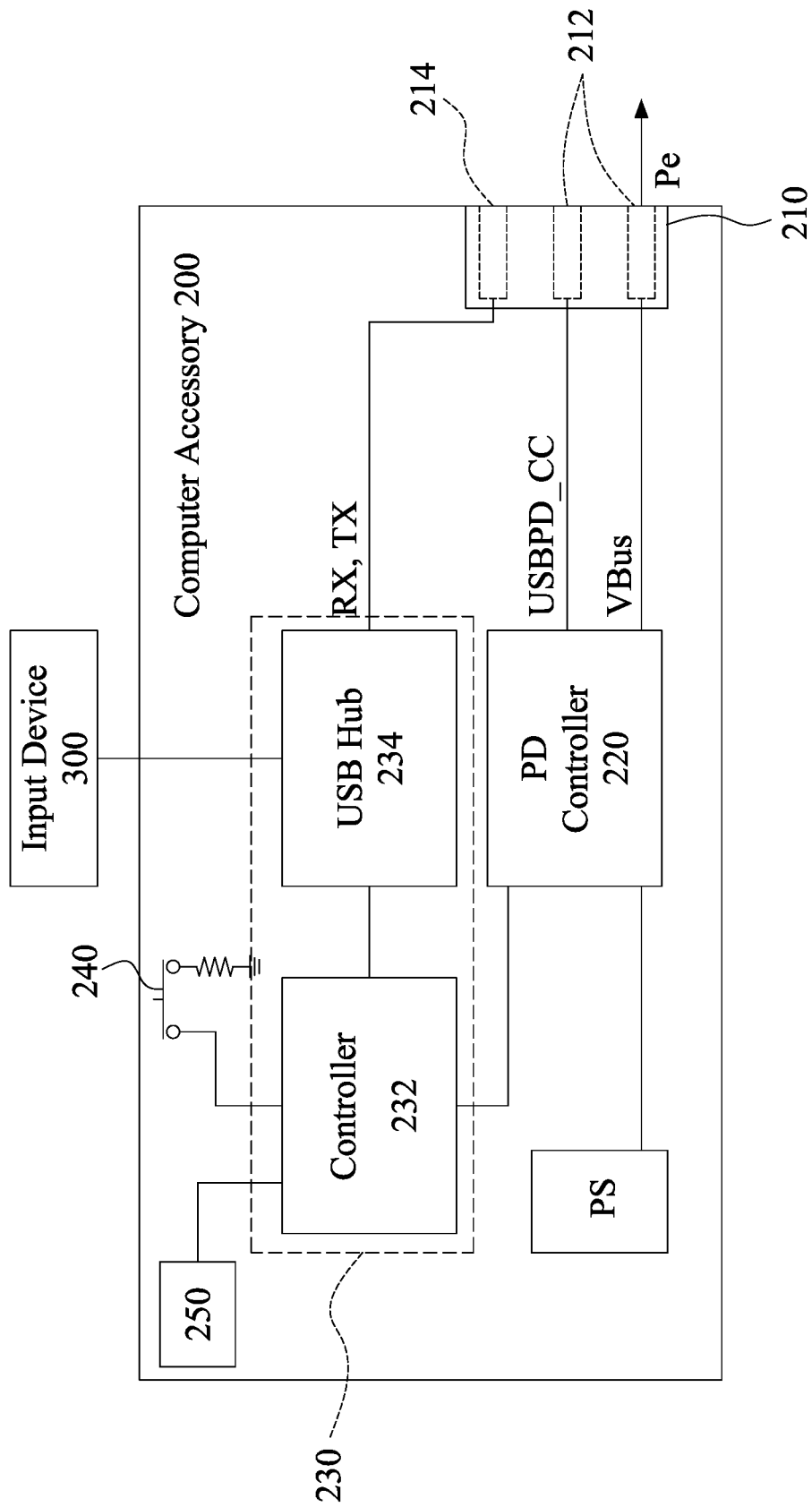
FIG. 2 is a circuit block diagram of a computer accessory according to the embodiment of this disclosure.

Referring to FIG. 1 and FIG. 2, a computer system 1 according to an embodiment of this disclosure includes a computer device 100 and a computer accessory 200.

As shown in FIG. 1, the computer device 100 includes a host connector 110. The host connector 110 at least includes a power receiving pin set 112 and a host signal pin set 114. And the power receiving pin set is configured to receive an external power Pe. The host signal pin set 114 configured to receive a communication signal. The communication signal may be, for example but not limited to, a sleep command or a wake up signal. The external power Pe is transformed by power management circuit of the computer device 100 and transmitted to the electronic components of the computer device 100. A power management mode of the computer device 100 is able to be set to various power modes for different power consumption requirements. In embodiments of this disclosure, the power management mode of the computer device 100 is able to be set to Wake on AC, so as to be awakened by the external power Pe and to switch a power mode of the computer device 100 from a waiting to be awakened state (S3, S4, S5) to a normal operation state (S0). The computer device 100 can be, but not limited to a notebook computer, a desktop computer, a smartphone or a computer having other configuration.

When the power management mode of the computer device 100 is set to Wake on AC, and the computer device is not connected to the external power Pe and is in the waiting to be awakened state (S3, S4, S5), The computer device 100 will perform a wake-up operation when connected to the external power Pe, so as to switch the power mode of the computer device 100 from the waiting to be awakened state (S3, S4, S5) to the normal operation state (S0); that is, restoring the connection of the external power Pe triggers the computer device 100 to recover to a state for normal operation from different idle or sleep states.

As shown in FIG. 1 and FIG. 2, the computer accessory 200 is configured to connect the computer device 100. The computer accessory 200 comprises an expansion connector 210, a power delivery controller 220, a control circuit 230, and a switch member 240.

As shown in FIG. 1 and FIG. 2, the expansion connector 210 is configured to connect the host connector 110 of the computer device 100. In different embodiments, the computer accessory 200 is an independent assembly, and expansion connector 210 connects the host connector 110 through a cable. In different embodiments, the computer accessory 200 is a dock station for the computer device 100 mounted thereon. The expansion connector 210 and the host connector 110 are male and female connectors directly connecting each other. In other embodiments, the computer accessory 200 is computer peripheral device having power delivery function. In at least one embodiment, the expansion connector 210 is a USB connector, and the host connector 110 is another USB connector. The aforementioned USB connectors can be Type-C connectors.

As shown in FIG. 1 and FIG. 2, the expansion connector 210 at least includes a power delivery pin set 212 and an expansion signal pin set 214. The power delivery pin set 212 is configured to connect the power delivery pin set 112 to establish a power connection and deliver the external power Pe to the computer device 100 through the power connection. The expansion signal pin set 214 is configured to connect the host signal pin set 114 to establish a communication connection.

As shown in FIG. 2, the power delivery controller 220 is configured to connect an electric power source PS to generate the external power Pe by using the electric power source PS. The electric power source PS can be a source of AC power, or a battery or other energy storage device. The power delivery controller 220 is connected to the power delivery pin set 212 to output the external power Pe through the power delivery pin set 212. The control circuit 230 is connected to the expansion signal pin set 214 and the power delivery controller 220. The control circuit is configured to control the output of the power delivery controller 220, so as to control the power delivery controller 220 to temporarily cut off the external power Pe and then restore the external power Pe. The switch member 240 is connected to the control circuit 230, and is configured to generate a switch signal to the control circuit 230. The switch signal SS is used to trigger the power delivery controller 220 to temporarily stop outputting the external power Pe and then restore the external power Pe.

As shown in FIG. 1 and FIG. 2, Through the power connection and the communication connection, the control circuit 230 detects and determines that the power mode is the normal operation state (S0), a Suspend-To-RAM state (S3), a Suspend-To-Disk state (S4), or a shutdown state (S5), and determines whether receiving the switching signal SS.

As shown in FIG. 1 and FIG. 2, in at least one embodiment, the expansion connector 210 and the host connector 110 are USB connectors. And the power delivery pin set 212 includes a channel configuration pin USBPD_CC and a power delivery pin Vbus, and the expansion signal pin set 214 at least includes a signal receiving pin and a signal transmitting pin. The control circuit 230 includes a controller 232 and a USB hub 234. The controller 232 can be, but not limited to a microcontroller Unit (MCU) or an embedded controller (EC). The controller 230 connects the expansion signal pin set 214 through the USB hub 234. The controller 232 connects the power delivery controller 220, to obtain the connection status of the power delivery pin set 212 through power delivery controller 220. Through the connection of the power delivery pin set 212 and the expansion signal pin set 214, the controller 232 is able to detect the power mode of the computer device 200. In some embodiments, the controller 232 detects and determines that the power mode of the computer device 200 is the normal operation state (S0), the Suspend-To-RAM state (S3), the Suspend-To-Disk state (S4), or the shutdown state (S5) by the following manners.

When the power mode is the normal operation state (S0), through the communication connection established by the expansion signal pin set 214 the controller 232 will be enumerated by the computer device 200 and receive the resume signal from the computer device 200. The computer device 200 is able to determine that the power mode is the normal operation state (S0) according to the resume signal, and detect an operation system version executed by the computer device 100 according to the resume signal.

When the power mode is the Suspend-To-RAM state (S3), through the communication connection established by the expansion signal pin set 214, the controller 232 receives a suspended signal from the computer device 100; according to the suspended signal, the controller 232 determines that the power mode is the Suspend-To-RAM state (S3).

When the power mode is the Suspend-To-Disk state (S4) or the shutdown state (S5), the controller 232 determines whether the expansion connector 210 connects the host connector 110 by detecting voltage level of the channel configuration pin USBPD_CC; if the expansion connector 210 connects the host connector 110 and no BUS event occurs (no signal is transmitted via the communication connection), the controller 232 determines that the power mode is the Suspend-To-Disk state (S4) or the shutdown state (S5).

When receiving the switch signal SS, according to different power mode, the controller 232 executes different switch operation.

Specifically, when the power mode is the normal operation state (S0), the controller 220 transmits the sleep command to the host signal pin set 114. After receiving the sleep command, the computer device 200 switches the power mode to the Suspend-To-RAM state (S3), so as to reduce power consumption of the computer device 200.

When the power mode is the Suspend-To-RAM state (S3), the controller 232 transmits a wake up signal to the host signal pin set 114. After receiving the wake up signal, the computer device 200 switches the power mode to the normal operation state (S0).

When the power mode is the Suspend-To-Disk state (S4) or the shutdown state (S5), the controller 232 controls the power delivery controller 220 to temporarily cut off the external power Pe and then restore the external power Pe. The computer device 100 is triggered to perform the wake-up operation to switch the power mode the power mode of the computer device 100 to the normal operation state (S0).

Through the computer accessory 200, the power mode of the computer device 100 can be simply switched by enabling the switch member 240 to generate the switch signal SS; in particular, operating the buttons/switches of the computer device, or manually disconnecting the host connector 110 and the expansion connector 210, is not required for performing the wake-up operation. In addition, as shown in FIG. 2, the switch member 240 can be directly or indirectly connected to an indicator 250, when the switch member 240 is enabled by touching, pressing or the other approach, the indicator 250 can simultaneously generate indication light or beeps to indicate the switch status of the switch member 240.

In at least one embodiment, the triggering switch member 240 is a push switch, such as a normal open switch or a normal close switch, the push switch can be pressed to generate the switch signal SS. In different embodiments, the switch member 240 is a capacitive button configured to be touched to generate the switch signal SS, to trigger the power delivery controller 220 to temporarily stop outputting the external power Pe and then restore the external power Pe. In different embodiments, the switch member 240 is a signal generating module and controlled through software, a micro controller, or a wireless signal command, to generate the switch signal SS, so as to trigger the power delivery controller 220 to temporarily stop outputting the external power Pe and then restore the external power Pe, as illustrated in STEP 160 and STEP 162. The aforementioned term "module" can be an application specific integrated circuit (ASIC), an electronic circuit, a microprocessor, a chip that executes one or more software or firmware programs, or a combinational logic circuit. The module is configured to execute various algorithms, transforms, and/or logical processes to generate one or more signals. When the module is implemented in software, a module can be readable instruction stored in memory for execution by the chip or the combinational logic circuit.

As shown in FIG. 2, in embodiments of this disclosure, an input device 300 is directly or indirectly connected to the computer device 100. In different embodiments, the input device 300 is directly connected to the computer device 100 and is mounted on a case of the notebook computer device 100 to serve as a part of the computer device 100. In one or more embodiments, the input device 300 is, but not limited to a keyboard, a mouse, a touch control pad, or other. In embodiments of this disclosure, the input device 300 is connected to the USB hub 234, so as to be connected to the computer device 100 and the controller 232 via the USB hub 234. In this case, the switch member 240 can be a designated key, a function key or a key combination of the input device 300.

As shown in FIG. 1, when the power mode is the normal operation state (S0), the computer device 100 continuously determines whether the input device 300 is operated. If the input device 300 has not been operated for a preset time period, for example 10 minutes, the computer device 100 returns to the Suspend-To-RAM state (S3).

Figure 3:
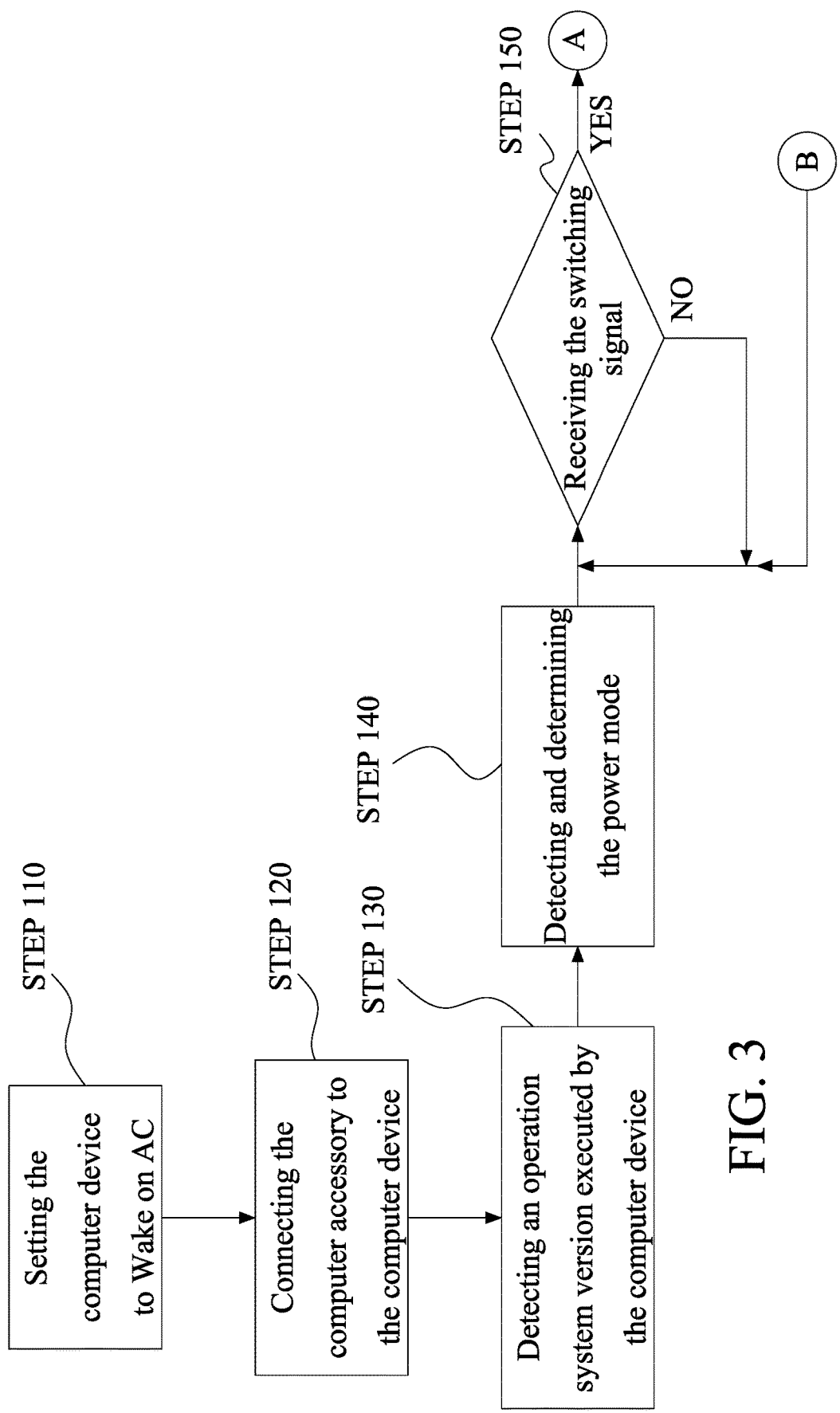
FIG. 3, FIG. 4, and FIG. 5 are flowcharts of a method for switching the power mode of the computer device according to the embodiment of this disclosure.

Referring to FIG. 3, Based on one or more embodiment of this disclosure, this disclosure further discloses a method for switching the power mode of the computer device 100, adapted to the computer accessory 200, the method is described below.

Figure 4:
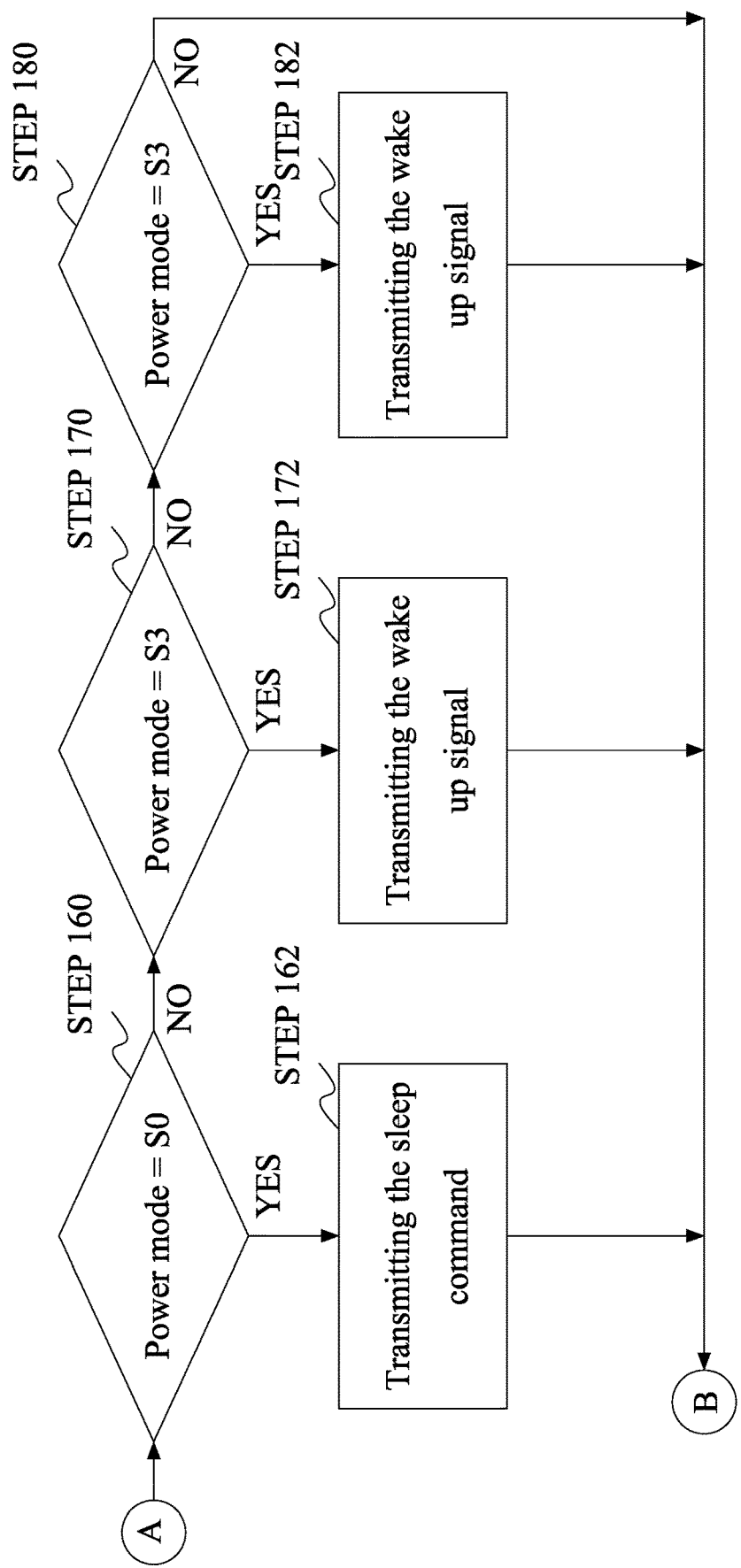

As shown in FIG. 2, FIG. 3, and FIG. 4, First, the power management mode of the computer device 100 is set to Wake on AC, that is the power management mode of the computer device 100 is set to be awakened when connected to the external power Pe and to switch a power mode of the computer device 100 from a shutdown state (S5) or a Suspend-To-Disk state (S4) to a normal operation state (S0), as illustrated in STEP 110. Next, the expansion connector 210 of the computer accessory 200 is connected to the host connector 110 of the computer device 100, so as to establish the power connection through the power delivery pin set 212 and the power receiving pin set 112, to deliver the external power Pe to the computer device 100, and to establish the communication connection through the expansion signal pin set 214 and the host signal pin set 114, as illustrated in STEP 120. The order of STEP 110 and STEP 120 may be exchanged. STEP 110 is executed when the power mode of the computer device 100 is the normal operation state (S0), and the computer device 100 is powered by a built-in battery or powered by the external power Pe after STEP 120 is executed in advance.

As shown in FIG. 2, FIG. 3, and FIG. 4, through the communication connection, the controller 232 detects an operation system version executed by the computer device 100, so as to generate the sleep command corresponding to the operation system version, as illustrated in STEP 130. The sleep command is a script segment of a USB HID report descriptor, and the USB HID report descriptor depends on the operation system version. Therefore, the controller 232 needs to detect the operation system version, so as to load a correct USB HID report descriptor to obtain a correct sleep command. The controller 232 can also obtain a power down command from the USB HID report descriptor, so as to transmit the power down command to the computer device 100 to shut down the computer device 100. In some embodiments, the operation system version may be, for example but not limited to, different versions of different operation systems such as MacOS 10, MacOS 11, Windows 8, or Windows 10. The communication signals such as the sleep command or the wake up signal may be generated or configured based on different instruction sets adopted by different operation systems.

As shown in FIG. 2, FIG. 3, and FIG. 4, through the power connection and the communication connection, the controller 232 detects and determines that the power mode is the normal operation state (S0), a Suspend-To-RAM state (S3), the Suspend-To-Disk state (S4), or the shutdown state (S5), as illustrated in STEP 140. Then, the controller 232 continuously determines whether receiving the switching signal SS, as illustrated in STEP 150. The controller 232 executes the following steps after receiving the switch signal SS.

As shown in FIG. 2, FIG. 3, and FIG. 4, when the power mode is the normal operation state (S0), the controller 220 transmits the sleep command to the host signal pin set 114, to switch the power mode to the Suspend-To-RAM state (S3), as illustrated in STEP 160 and STEP 162.

As shown in FIG. 2, FIG. 3, and FIG. 4, when the power mode is the Suspend-To-RAM state (S3), the controller 232 transmits a wake up signal to the host signal pin set 114, to switch to the power mode to the normal operation (S0), as illustrated in STEP 170 and STEP 172. The wake up signal is a data package, as long as content of the data package does not involve changing the other status of the computer device 100.

As shown in FIG. 2, FIG. 3, and FIG. 4, When the power mode is the Suspend-To-Disk state (S4) or the shutdown state (S5), the controller 232 controls the power delivery controller 220 to temporarily cut off the external power Pe and then restores the external power Pe, so as to trigger the computer device 100 to perform the wake-up operation to switch to the power mode to the normal operation (S0), as illustrated in STEP 180 and STEP 182. In some embodiment, when the computer accessory 200 is connected to the host connector 110 of the computer device 100, the power connection through the power delivery pin set 212 and the power receiving pin set 112 is established but the external power Pe is not delivered to the computer device 100 through the power connection until further triggering. For example, a default setting of the computer accessory 200 is not outputting the external power Pe whether the power connection is established or not (e.g., whether the computer accessary 200 is connected to the computer device 100 or not) until STEP 192 is executed. In such case, STEP 192 is to (1) control the PD controller 220 to temporarily cut off the external power Pe and then restore the external power Pe while the external power Pe is already outputted by the PD controller 220; or (2) control the PD controller 220 to output the external power Pe while the external power Pe is not yet outputted by the PD controller 220.

In different embodiments, the order of STEP 160, STEP 170 and STEP 180 may be exchanged; the order is limited to that shown in FIG. 3. After STEP 162, STEP 172 and STEP 182, the method returns to STEP 150, to determine whether another switch signal SS is received.

Figure 5:
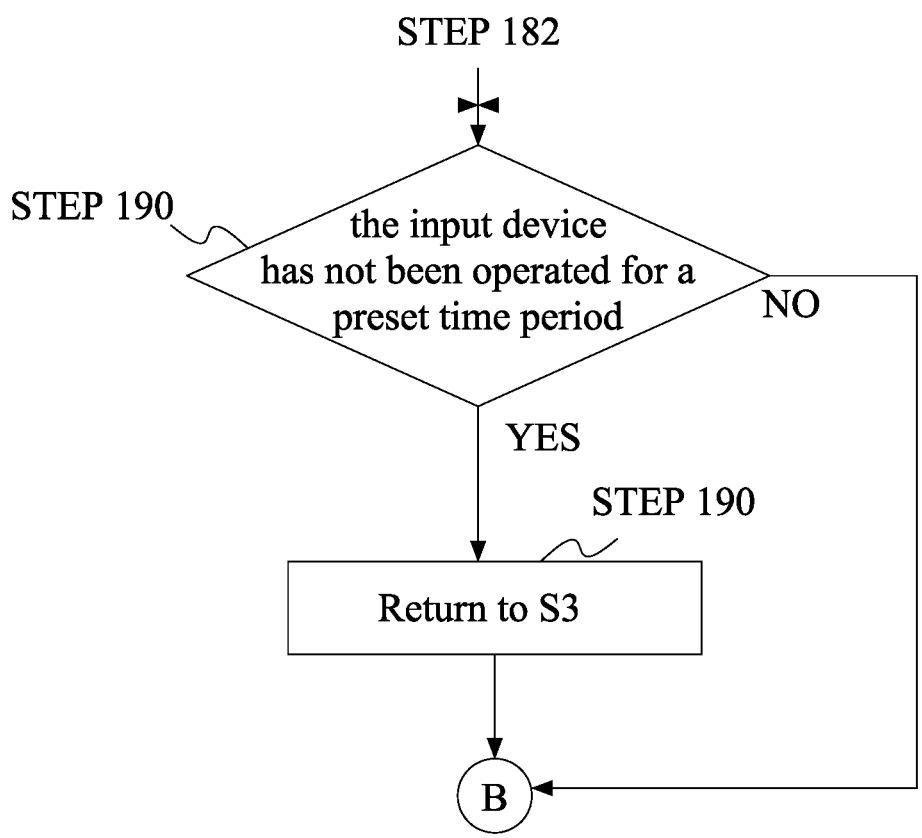

As shown in FIG. 4 and FIG. 5, after STEP 182, the method is continuously determines whether the input device 300 is operated, as illustrated in STEP 190.

If the input device 300 has not been operated for a preset time period, for example 10 minutes, the computer device 100 returns to the Suspend-To-RAM state (S3) as illustrated in STEP 200.

In one embodiment or some embodiments of this disclosure, switching the power mode only requires simple operation of the switch member 240 to generate the switch signal SS, directly operating buttons/switches of the computer device 100 is not required, and manually disconnecting and reconnecting the connection between the expansion connector 210 and host connector 110 is not required. For example, in a case that the computer accessory is already connected to a notebook as the computer device 100 with the lid closed, the input device connected, and an external display connected, the power mode of the computer device switched simply by triggering the switch member without the needs of opening the lid or reconnecting the computer accessory. Therefore, the approach to switch the power mode becomes more convenient. In addition, the approaches in one or more embodiments of this disclosure can be easily combined with a general AC-DC power adapter or docking station, and applicable to products from various venders.

What is claimed is:

1. A method for switching a power mode of a computer device, adapted to a computer accessory, wherein the computer device comprises a host connector, the host connector comprises a power receiving pin set and a host signal pin set, the power receiving pin set is configured to receive an external power, and the host signal pin set is configured to receive a communication signal; the method comprising:
    connecting the computer accessory to the host connector of the computer device to establish a power connection through the power receiving pin set and deliver an external power to the computer device, and to establish a communication connection through the host signal pin set;
    through the power connection and the communication connection, detecting and determining the power mode of the computer device to be a normal operation state, a Suspend-To-RAM state, a Suspend-To-Disk state, or a shutdown state; and
    determining whether the computer accessory receives a switch signal, and executing one of following steps based on a detection and determination of the power mode of the computer device upon receiving the switch signal:
    when the power mode is detected and determined to be the normal operation state, transmitting a sleep command of the communication signal to the host signal pin set;
    when the power mode is detected and determined to be the Suspend-To-RAM state, transmitting a wake up signal of the communication signal to the host signal pin set; and
    when the power mode is detected and determined to be the Suspend-To-Disk state or the shutdown state, using the computer accessory to temporarily cut off the external power and then restore the external power.

2. The method according to claim 1, further comprising through the communication connection detecting an operation system version executed by the computer device, to generate the communication signal corresponding to the operation system version.

3. The method according to claim 2, wherein the sleep command is a script segment of a USB HID report descriptor, the USB HID report descriptor depends on the operation system version, and the wake up signal is a data package.

4. The method according to claim 1, further comprising disposing a switch member on the computer accessory, wherein the switch member is configured to generate the switch signal.

5. The method according to claim 1, further comprising when the power mode is the normal operation state, determining whether an input device of the computer device is operated; and if the input device has not been operated for a preset time period, the computer device returns to the Suspend-To-RAM state.

6. The method according to claim 1, further comprising setting a power management mode of the computer device to be awakened when connected to the external power, to switch the power mode of the computer device to the normal operation state.

7. A computer accessory, for connecting to a computer device, wherein the computer device comprises a host connector, the host connector comprises a power receiving pin set and host signal pin set, and the power receiving pin set is configured to receive an external power, and the host signal pin set is configured to receive a communication signal; the computer accessory comprising:
an expansion connector configured to connect to the host connector; wherein the expansion connector comprises a power delivery pin set and an expansion signal pin set, the power delivery pin set is configured to connect the power receiving pin set to establish a power connection to transmit the external power to the computer device, and the expansion signal pin set is configured to connect the host signal pin set to establish a communication connection;
a power delivery controller, connected to the power delivery pin set to output the external power through the power delivery pin set;
a control circuit connected to the expansion signal pin set and the power delivery controller; and
a switch member connected to the control circuit and configured to generate a switch signal to the control circuit;
wherein through the power connection and the communication connection, the control circuit detects and determines a power mode of the computer device to be a normal operation state, a Suspend-To-RAM state, a Suspend-To-Disk state, or a shutdown state, and determines whether receiving the switch signal, and the control circuit is arranged to execute one of following steps based on a detection and determination of the power mode of the computer device upon receiving the switch signal:
when the power mode is detected and determined to be the normal operation state, transmitting a sleep command of the communication signal to the host signal pin set;
when the power mode is detected and determined to be the Suspend-To-RAM state, transmitting a wake up signal of the communication signal to the host signal pin set; and
when the power mode is detected and determined to be the Suspend-To-Disk state or the shutdown state, controlling the power delivery controller to temporarily cutting off the external power and then restore the external power.

8. The computer accessory according to claim 7, wherein through the communication connection the control circuit detects an operation system version executed by the computer device, to generate the communication signal corresponding to the operation system version.

9. The computer accessory according to claim 8, wherein the expansion connector is a USB connector.

10. The computer accessory according to claim 9, wherein the control circuit comprises a controller and a USB hub, the controller connects the expansion signal pin set through the USB hub and the controller is configured to detect the operation system version to generate the communication signal corresponding to the operation system version.

11. The computer accessory according to claim 10, wherein the sleep command is a script segment of a USB HID report descriptor, the USB HID report descriptor depends on the operation system version, and the wake up signal is a data package.

12. The computer accessory according to claim 9, wherein the power delivery pin set comprises a channel configuration pin, and through the channel configuration pin the control circuit detects whether the expansion connector connects the host connector.

13. A computer system, comprising:
a computer device, comprising a host connector; wherein the host connector comprises a power receiving pin set and host signal pin set, the power receiving pin set is configured to receive an external power, and the host signal pin set is configured to receive a communication signal; and
a computer accessory, comprising:
an expansion connector configured to connect to the host connector; wherein the expansion connector comprises a power delivery pin set and an expansion signal pin set, the power delivery pin set is configured to connect the power receiving pin set to establish a power connection to transmit the external power to the computer device, and the expansion signal pin set is configured to connect the host signal pin set to establish a communication connection;
a power delivery controller, connected to the power delivery pin set to output the external power through the power delivery pin set;
a control circuit, connected to the expansion signal pin set and the power delivery controller; and
a switch member, connected to the control circuit and configured to generate a switch signal to the control circuit;
wherein through the power connection and the communication connection, the control circuit detects and determines a power mode of the computer device to be a normal operation state, a Suspend-To-RAM state, a Suspend-To-Disk state, or a shutdown state, and determines whether receiving the switch signal, and the control circuit is arranged to execute one of following steps based on a detection and determination of the power mode of the computer device upon receiving the switch signal:
when the power mode is detected and determined to be the normal operation state, transmitting a sleep command of the communication signal to the host signal pin set, to switch the power mode to the Suspend-To-RAM state;
when the power mode is detected and determined to be the Suspend-To-RAM state, transmitting a wake up signal of the communication signal to the host signal pin set, to switch to the power mode to be the normal operation; and
when the power mode is detected and determined to be the Suspend-To-Disk state or the shutdown state, controlling the power delivery controller to temporarily cutting off the external power and then restore the external power, to switch to the power mode to the normal operation state.

14. The computer system according to claim 13, wherein through the communication connection the control circuit detects an operation system version executed by the computer device, to generate the communication signal corresponding to the operation system version.

15. The computer system according to claim 14, wherein the expansion connector a USB connector.

16. The computer system according to claim 15, wherein the control circuit comprises a controller and a USB hub, the controller connects the expansion signal pin set through the USB hub and the controller is configured to detect the operation system version to generate the communication signal corresponding to the operation system version.

17. The computer system according to claim 16, wherein the sleep command is a script segment of a USB HID report descriptor, the USB HID report descriptor depends on the operation system version, and the wake up signal is a data package.

18. The computer system according to claim 15, wherein the power delivery pin set comprises a channel configuration pin, and through the channel configuration pin the control circuit detects whether the expansion connector connects the host connector.

19. The computer system according to claim 13, wherein when the power mode is the normal operation state, the computer device determines whether an input device of the computer device is operated; and if the input device has not been operated for a preset time period, the computer device returns to the Suspend-To-RAM state.

20. The computer system according to claim 13, wherein a power management mode of the computer device is set to be awakened to perform a wake-up operation when connected to the external power, to switch the power mode of the computer device to the normal operation state.

* * * * *